(12) United States Patent
Shin et al.

(10) Patent No.: US 12,347,427 B2
(45) Date of Patent: Jul. 1, 2025

(54) MEDIUM SELECTION FOR PROVIDING INFORMATION CORRESPONDING TO VOICE REQUEST

(71) Applicants: NAVER CORPORATION, Seongnam-si (KR); LY CORPORATION, Tokyo (JP)

(72) Inventors: Myeongsoo Shin, Seongnam-si (KR); Seijin Cha, Seongnam-si (KR); Eonjoung Choi, Seongnam-si (KR)

(73) Assignees: NAVER CORPORATION, Seongnam-si (KR); LY CORPORATION, Tokyo (JP)

( * ) Notice: Subject to any disclaimer, the term of this patent is extended or adjusted under 35 U.S.C. 154(b) by 164 days.

(21) Appl. No.: 16/688,428

(22) Filed: Nov. 19, 2019

(65) Prior Publication Data
US 2020/0090654 A1 Mar. 19, 2020

Related U.S. Application Data

(63) Continuation of application No. PCT/KR2018/004556, filed on Apr. 19, 2018.

(30) Foreign Application Priority Data

May 19, 2017 (KR) .......................... 10-2017-0062113

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G06F 16/48* (2019.01);
(Continued)

(58) Field of Classification Search
CPC ......... G10L 15/00; G10L 15/22; G10L 15/30; G10L 15/1815; G10L 2015/088;
(Continued)

(56) References Cited

U.S. PATENT DOCUMENTS

2008/0214104 A1* 9/2008 Baumert .......... H04N 21/44227
455/3.06
2009/0063703 A1* 3/2009 Finkelstein ......... G06F 16/4393
709/240
(Continued)

FOREIGN PATENT DOCUMENTS

JP 2002125161 A 4/2002
KR 1020090084212 A 8/2009
(Continued)

OTHER PUBLICATIONS

ISR issued in Int'l. App. No. PCT/KR2018/004556, mailed Jul. 20, 2018.

*Primary Examiner* — Daniel C Washburn
*Assistant Examiner* — Sean E Serraguard
(74) *Attorney, Agent, or Firm* — Greer Burns & Crain Ltd.

(57) ABSTRACT

Provided is a technique for providing information corresponding to a voice request. A method by which an electronic device including a voice-based interface provides information, comprises the steps of: managing information on a plurality of media including a main medium, which corresponds to a voice-based interface, and a sub-medium, which is included by other electronic devices linked with the electronic device and enabling a visual output; receiving a voice request from a user through the voice-based interface; acquiring response information corresponding to the voice request; determining at least one medium for outputting the response information among the plurality of media on the basis of at least one of the voice request and/or the response (Continued)

information; and transferring the response information to at least one determined medium such that the response information is outputted through at least one determined medium.

19 Claims, 10 Drawing Sheets

(51) Int. Cl.
| | | |
|---|---|---|
| *G06F 16/48* | (2019.01) | |
| *G10L 15/08* | (2006.01) | |
| *G10L 15/18* | (2013.01) | |
| *G10L 15/30* | (2013.01) | |

(52) U.S. Cl.
CPC .......... *G10L 15/1815* (2013.01); *G10L 15/30* (2013.01); *G10L 2015/088* (2013.01); *G10L 2015/223* (2013.01)

(58) Field of Classification Search
CPC ..... G10L 2015/223; G06F 3/00; G06F 3/167; G06F 16/00; G06F 16/48
See application file for complete search history.

(56) References Cited

U.S. PATENT DOCUMENTS

| | | | | |
|---|---|---|---|---|
| 2011/0239142 A1* | 9/2011 | Steeves | ............... | G06F 3/14 345/3.1 |
| 2013/0050274 A1* | 2/2013 | Yamada | ............. | H04N 21/4751 345/671 |
| 2014/0325033 A1* | 10/2014 | Basso | ................ | H04N 21/4147 709/219 |
| 2015/0294015 A1* | 10/2015 | Ilyas | ................ | G06F 16/24578 707/732 |
| 2015/0382047 A1* | 12/2015 | Van Os | .................. | G10L 17/22 725/38 |
| 2016/0134948 A1* | 5/2016 | Xu | ................... | H04N 21/41265 725/116 |
| 2016/0155443 A1* | 6/2016 | Khan | .................... | G06F 1/3203 704/275 |
| 2017/0025124 A1* | 1/2017 | Mixter | .................... | G10L 15/32 |
| 2017/0068423 A1* | 3/2017 | Napolitano | ...... | H04N 21/42204 |
| 2018/0018967 A1* | 1/2018 | Lang | ....................... | G06F 3/167 |
| 2018/0047393 A1* | 2/2018 | Tian | ........................ | G10L 17/06 |
| 2018/0150130 A1* | 5/2018 | Fowler | .................... | G06F 3/011 |
| 2020/0120384 A1* | 4/2020 | Armaly | .............. | H04N 21/4396 |

FOREIGN PATENT DOCUMENTS

| | | |
|---|---|---|
| KR | 1020100066918 A | 6/2010 |
| KR | 1020110139797 A | 12/2011 |
| KR | 1020150103586 A | 9/2015 |
| KR | 1020160071732 A | 6/2016 |
| KR | 1020170000751 A | 1/2017 |

* cited by examiner

MEDIUM SELECTION FOR PROVIDING INFORMATION CORRESPONDING TO VOICE REQUEST

CROSS-REFERENCE TO RELATED APPLICATIONS

This is a continuation application of International Application No. PCT/KR2018/004556, filed Apr. 19, 2018, which claims benefit of Korean Patent Application No. 10-2017-0062113, filed May 19, 2017.

BACKGROUND OF THE INVENTION

Field of Invention

Example embodiments of the following description relate to technology for selecting media for providing information corresponding to a voice request, and more particularly, to an information providing method and system for automatically selecting media for outputting response information based on a voice request and/or response information when providing an answer and/or additional information corresponding to the voice request, a computer program stored in a non-transitory computer-readable storage medium to implement the information providing method on a computer in conjunction with the computer, and the non-transitory computer-readable storage medium.

Description of Related Art

An interface operating based on voice, such as an artificial intelligence (AI) speaker of a home network service, may receive a voice request of a user through a microphone, may synthesize an answering voice to provide response information corresponding to the voice request, and may provide the same through a speaker or may output audio of content included in the response information. For example, Korean Patent Laid-Open Publication No. 10-2011-0139797 relates to technology for a home media device and a home network system and method using the same and accordingly, describes technology that provides a home network service using a second communication network such as wireless fidelity (WiFi) in addition to a mobile communication network in the home network service and enables a user to perform a multiple-control on a plurality of in-home multimedia devices through a voice command without separately manipulating a button.

However, in such related arts, response information is simply output through predesignated media, such as, for example, using only an auditory output of the response information or further outputting the same content as response information that is output simply in an auditory manner through a display of a specific device (e.g., a smartphone of a user) and output media suitable for the voice request and/or the response information is not selected.

BRIEF SUMMARY OF THE INVENTION

One or more example embodiments provide an information providing method and an information providing system that may manage information about a plurality of pieces of media, such as main media corresponding to a voice-based interface included in an electronic device, such as an artificial intelligence (AI) speaker, and sub media (e.g., a display included in a smartphone, an Internet protocol television (IPTV), a smart refrigerator, etc.) included in another electronic device interacting with the electronic device and may automatically select media for outputting response information from among a plurality of pieces of media based on a voice request received through the voice-based interface and the response information corresponding to the voice request, a computer program stored in a non-transitory computer-readable storage medium to implement the information providing method on a computer in conjunction with the computer, and the non-transitory computer-readable storage medium.

One or more example embodiments provide an information providing method and an information providing system that may easily connect to a subsequent action likely to occur after providing information by connecting to a service (e.g., a service provided through an application installed on a smartphone) provided from selected media or by providing response information and additional information associated with the response information through different pieces of media instead of simply outputting the response information in an auditory and/or visual manner, a computer program stored in a non-transitory computer-readable storage medium to implement the information providing method on a computer in conjunction with the computer, and the non-transitory computer-readable storage medium.

One or more example embodiments provide an information providing method and an information providing system that may effectively determine sub media used to provide response information among a plurality of pieces of sub media, a computer program stored in a non-transitory computer-readable storage medium to implement the information providing method on a computer in conjunction with the computer, and the non-transitory computer-readable storage medium.

According to an aspect of at least one example embodiment, there is provided an information providing method of an electronic device including a voice-based interface, the method including managing information about a plurality of pieces of media including main media corresponding to the voice-based interface and sub media included in another electronic device capable of performing a visual output through interaction with the electronic device; receiving a voice request from a user through the voice-based interface; acquiring response information corresponding to the voice request; determining at least one piece of media for outputting the response information from among the plurality of pieces of media based on the voice request and the response information; and forwarding the response information to the determined at least one piece of media such that the response information is output through the determined at least one piece of media.

According to an aspect of at least one example embodiment, there is provided a non-transitory computer-readable storage medium storing a computer program to implement the information providing method on a computer.

According to an aspect of at least one example embodiment, there is provided a computer program stored in a non-transitory computer-readable storage medium to implement the information providing method on a computer in conjunction with the computer.

According to an aspect of at least one example embodiment, there is provided an electronic device including a voice-based interface; and at least one processor configured to execute a computer-readable instruction. The at least one processor is configured to manage information about a plurality of pieces of media including main media corresponding to the voice-based interface and sub media included in another electronic device capable of performing a visual output through interaction with the electronic device, to receive a voice request from a user through the voice-based interface, to acquire response information corresponding to the voice request, to determine at least one piece of media for outputting the response information from among the plurality of pieces of media based on the voice request and the response information, and to forward the response information to the determined at least one piece of media such that the response information is output through the determined at least one piece of media.

According to some example embodiments, it is possible to manage information about a plurality of pieces of media, such as main media corresponding to a voice-based interface included in an electronic device, such as an artificial intelligence (AI) speaker, and sub media (e.g., a display included in a smartphone, an Internet protocol television (IPTV), a smart refrigerator, etc.) included in another electronic device interacting with the electronic device and to automatically select media for outputting response information from among a plurality of pieces of media based on a voice request received through the voice-based interface and the response information corresponding to the voice request.

According to some example embodiments, it is possible to easily connect to a subsequent action likely to occur after providing information by connecting to a service (e.g., a service provided through an application installed on a smartphone) provided from selected media or by providing response information and additional information associated with the response information through different pieces of media instead of simply outputting the response information in an auditory and/or visual manner.

According to some example embodiments, although response information is provided through sub media, it is possible to further effectively determine sub media used to provide response information among a plurality of pieces of sub media.

DETAILED DESCRIPTION OF THE INVENTION

Figure 1:
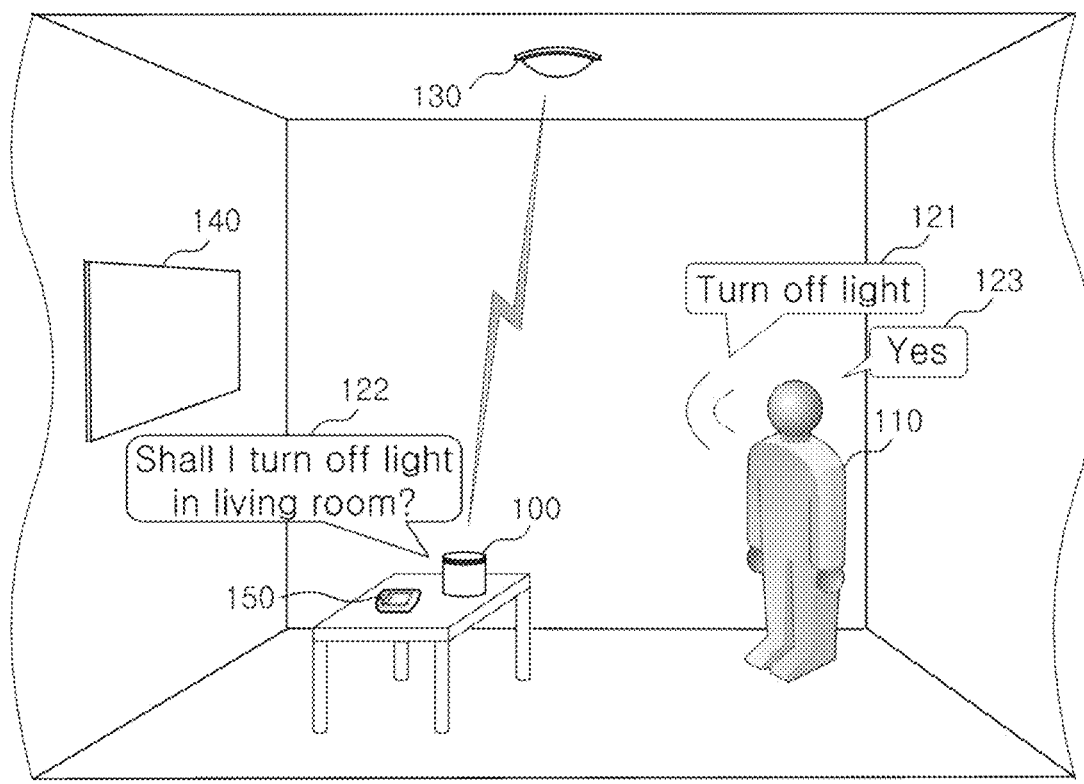
FIG. 1 illustrates an example of a service environment using a voice-based interface according to an example embodiment.

Hereinafter, example embodiments will be described with reference to the accompanying drawings.

An information providing system according to example embodiments may be configured through an electronic device providing an interface that operates based on voice. The electronic device may generate response information by directly processing such a voice request or may process the voice request by recognizing and analyzing the voice request through an external platform connected using a separate interface connector. For example, the external platform may include a cloud artificial intelligence (AI) platform configured to receive a voice request of a user from the electronic device, to analyze the received voice request, and to generate a query suitable for intent of the user or response information corresponding to the query. Here, the electronic device may select media for outputting response information based on the voice request and/or response information. The media may include main media corresponding to a voice-based interface included in the electronic device and sub media included in another electronic device capable of outputting a visual output through interaction with the electronic device. For example, the sub media may correspond to a display included in the other electronic device or a specific application installed on the other electronic device. In detail, when the display of the other electronic device is determined as media for outputting response information, the response information may be output through the display of the other electronic device. As another example, when the specific application of the other electronic device is determined as media for outputting response information, the response information may be output through interaction with a service provided from the application. For example, a case in which information about "good place A to eat" is acquired as response information in response to a voice request of a user saying "find a good place to eat nearby" may be considered. Here, information about "good place A to eat" may be output in an auditory manner through the voice-based interface included in the electronic device. Also, information about "good place A to eat" may be output in a visual manner through a display of the other electronic device interacting with the electronic device. Further, information about "good place A to eat" may be output through the display of the other electronic device such that information about a position of "good place A to eat" may be output on a map in conjunction with a map application installed on the other electronic device. It will be easily understood by those skilled in the art that such an application may include not only the map application but also various types of existing applications, such as, for example, a schedule application for managing a schedule based on a voice request and/or response information, a search application, a translation application, a game application, a messenger application, a store application, etc.

An information providing method according to example embodiments may be performed by the aforementioned electronic device. Here, a computer program according to an example embodiment may be installed and executed on the electronic device, and the electronic device may perform the information providing method under control of the executed computer program. The aforementioned computer program may be stored in a non-transitory computer-readable storage medium to implement the information providing method on a computer in conjunction with the electronic device configured as the computer.

FIG. 1 illustrates an example of a service environment using a voice-based interface according to an example embodiment. The example embodiment of FIG. 1 represents an example in which an electronic device 100 including a voice-based interface (e.g., a microphone and a speaker) recognizes and analyzes a voice request received in response to "Turn off light" 121 that is an utterance of a user 110 through a microphone and outputs response information "Shall I turn off light in living room?" 122 through a speaker in technology for connecting and controlling in-house devices, such as a smart home or a home network service. Also, the example embodiment of FIG. 1 illustrates an example in which the electronic device 100 recognizes and analyzes a voice request received in response to "Yes" 123 that is an utterance of the user 110 corresponding to the response information and controls a light power of an in-house lighting device 130 interacting with the electronic device 100 over an internal network.

Here, in-house devices may include various devices connectable and controllable online, for example, home appliances such as an Internet protocol television (IPTV), a personal computer (PC), a peripheral device, an air conditioner, a refrigerator, and a robot cleaner, energy consumption devices such as a water supply, an electricity, an air-conditioning and heating device, and a security device such as a door lock and a surveillance camera, in addition to the aforementioned in-house lighting device 130. Also, the internal network may employ wired network technology, for example, Ethernet, HomePNA, and Institute of Electrical and Electronics Engineers (IEEE) 1394, and wireless network technology such as Bluetooth, ultra wideband (UWB), ZigBee, wireless 1394, and a home radio frequency (RF).

The electronic device 100 may be one of in-house devices. For example, the electronic device 100 may be one of devices such as an AI speaker or a robot cleaner provided in a house. Also, the electronic device 100 may be a mobile device of the user 110, for example, a smartphone, a mobile phone, a laptop computer, a digital broadcasting terminal, a personal digital assistant (PDA), a portable multimedia player (PMP), and a tablet PC. As described above, any type of devices including a function connectable to in-house devices to receive a voice request of the user 110 and to control the in-house devices may be used for the electronic device 100 without being particularly limited. Also, depending on example embodiments, the aforementioned mobile devices of the user 110 may be included as the in-house devices.

Although response information may be basically output through main media (e.g., a speaker) corresponding to a voice-based interface as shown in the example embodiment of FIG. 1, the response information may be output through a variety of media depending on example embodiments, which is described above. The electronic device 100 may determine media through which response information is output based on a voice request and/or response information. For example, FIG. 1 further illustrates an IPTV 140 and a mobile device 150 of the user 110. In this case, the response information may be output for the user 110 in a visual manner through a display of the IPTV 140 or the mobile device 150. Here, the electronic device 100 may determine media for outputting the response information based on efficiency of auditory output and visual output instead of simply determining the media for providing the response information.

Figure 2:
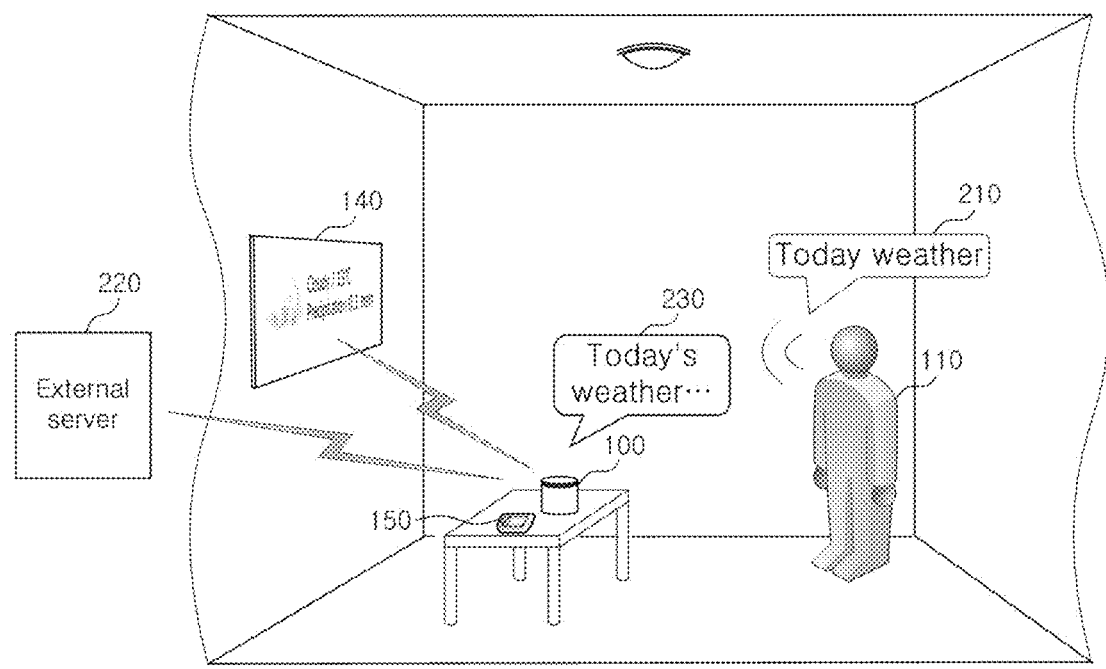
FIG. 2 illustrates another example of a service environment using a voice-based interface according to an example embodiment.

FIG. 2 illustrates another example of a service environment using a voice-based interface according to an example embodiment. The example embodiment of FIG. 2 represents an example in which the electronic device 100 including a voice-based interface recognizes and analyzes an utterance "Today weather" 210 of the user 110, acquires information about today's weather from an external server 220 over an external network, and synchronizes and outputs the acquired information as a voice "Todays' weather . . . ". For example, the external network may include at least one of network topologies that include a personal area network (PAN), a local area network (LAN), a campus area network (CAN), a metropolitan area network (MAN), a wide area network (WAN), a broadband network (BBN), and the Internet.

In the example embodiment of FIG. 2, the electronic device 100 may be one of in-house devices or one of mobile devices of the user 110. Any type of devices including a function for receiving and processing a voice request of the user 110 and a function for connecting to the external server 220 and providing content or a service provided from the external server 220 to the user 110 may be used for the electronic device 100 without being particularly limited. As described above, any of devices capable of processing a voice request received according to an utterance of the user 110 through the voice-based interface may be used for the electronic device 100 without being particularly limited. For example, the electronic device 100 may process a voice request of the user 110 by recognizing and analyzing the voice request, and, depending on example embodiments, may also process the voice request through an external platform, for example, the aforementioned cloud AI platform, linked to the electronic device 100.

Here, the electronic device 100 may automatically determine media for outputting response information corresponding to the voice request of the user 110 based on the voice request and/or the response information. FIG. 2 illustrates an example in which the electronic device 100 outputs the response information in an auditory manner, such as "Today's weather . . . " 230, and, at the same time, outputs the response information in a visual manner through the display of the IPTV 140. To this end, the electronic device 100 may manage information about a plurality of pieces of media capable of outputting response information, may select at least one piece of media for outputting response information from among the plurality of pieces of media based on the voice request and/or the response information, and may forward the response information to the selected media.

Figure 3:
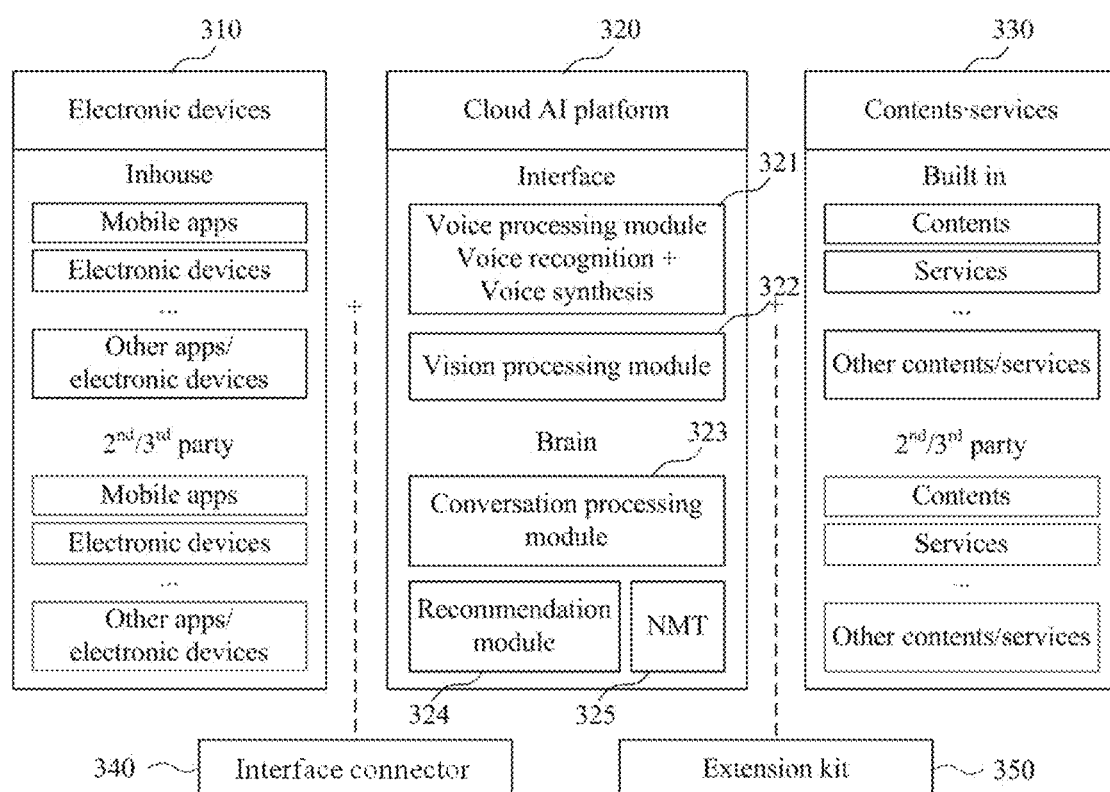
FIG. 3 illustrates an example of a cloud artificial intelligence (AI) platform according to an example embodiment.

FIG. 3 illustrates an example of a cloud AI platform according to an example embodiment. FIG. 3 illustrates electronic devices 310, a cloud AI platform 320, and a content/service 330.

For example, the electronic devices 310 may indicate devices provided in a house, and may at least include the aforementioned electronic device 100. The electronic devices 310 or applications (hereinafter, apps) installed and executed on the electronic devices 310 may be linked to the cloud AI platform 320 through an interface connector 340. Here, the interface connector 340 may provide developers with a software development kit (SDK) and/or development documents for developing the electronic devices 310 or apps installed and executed on the electronic devices 310. Also, the interface connector 340 may provide an application program interface (API) such that the electronic devices 310 or the apps installed and executed on the electronic devices 310 may use functions provided from the cloud AI platform 320. In detail, devices or apps developed by the developers using the SDK and/or development documents provided from the interface connector 340 may use functions provided from the cloud AI platform 320 using the API provided from the interface connector 340. The interface connector 340 may be included in the cloud AI platform 320 or a computer device that operates separately at a provider side of the cloud AI platform 320.

Here, the cloud AI platform 320 may provide a function for providing a voice-based service. For example, the cloud AI platform 320 may include various modules for providing a voice-based service, such as a voice processing module 321 configured to recognize a received voice and synthesize a voice to be output, a vision processing module 322 configured to analyze and process a received image or video, a conversation processing module 323 configured to determine an appropriate chat to output a voice suitable for the received voice, a recommendation module 324 configured to recommend a function suitable for the received voice, and a neural machine translation (NMT) 325 configured to support AI to translate a language based on a sentence unit through data learning. Each of the various modules may be function of at least one of processors included in at least one of computer device implementing the cloud AI platform 320.

For example, in the example embodiments of FIGS. 1 and 2, the electronic device 100 may transmit a voice request of the user 110 to the cloud AI platform 320 using the API provided from the interface connector 340. In this case, the cloud AI platform 320 may recognize and analyze the received voice request through the aforementioned modules 321 through 325, and may synthesize and provide an appropriate answering voice or may recommend an appropriate operation in response to the received voice request.

Also, an extension kit 350 may provide a development kit such that third party content developers or companies may configure a new voice-based function based on the cloud AI platform 320. For example, in the example embodiment of FIG. 2, the electronic device 100 may transmit the received voice request of the user 110 to the external server 220, and the external server 220 may transmit the voice request to the cloud AI platform 320 through the API provided through the expansion kit 350. In this case, similar to the aforementioned manner, the cloud AI platform 320 may recognize and analyze the received voice request and may synthesize and provide an appropriate answering voice or may provide the external server 220 with recommendation information about a function to be processed through the voice request. For example, referring to FIG. 2, the external server 220 may transmit the voice request "Today weather" to the cloud AI platform 320 and may receive, from the cloud AI platform 320, keywords "today" and "weather" that are extracted by recognizing the voice request "Today weather". In this case, the external server 220 may generate text information, such as "Today's weather . . . " using the keywords "today" and "weather" and may transmit again the generated text information to the cloud AI platform 320. Here, the cloud AI platform 320 may synthesize the text information with a voice and may provide the synthesized voice to the external server 220. The external server 220 may transmit the synthesized voice to the electronic device 100 and the electronic device 100 may output the synthesized sound "Today's weather . . . " through a speaker. In this manner, the voice request "today weather" received from the user 110 may be processed.

Figure 4:
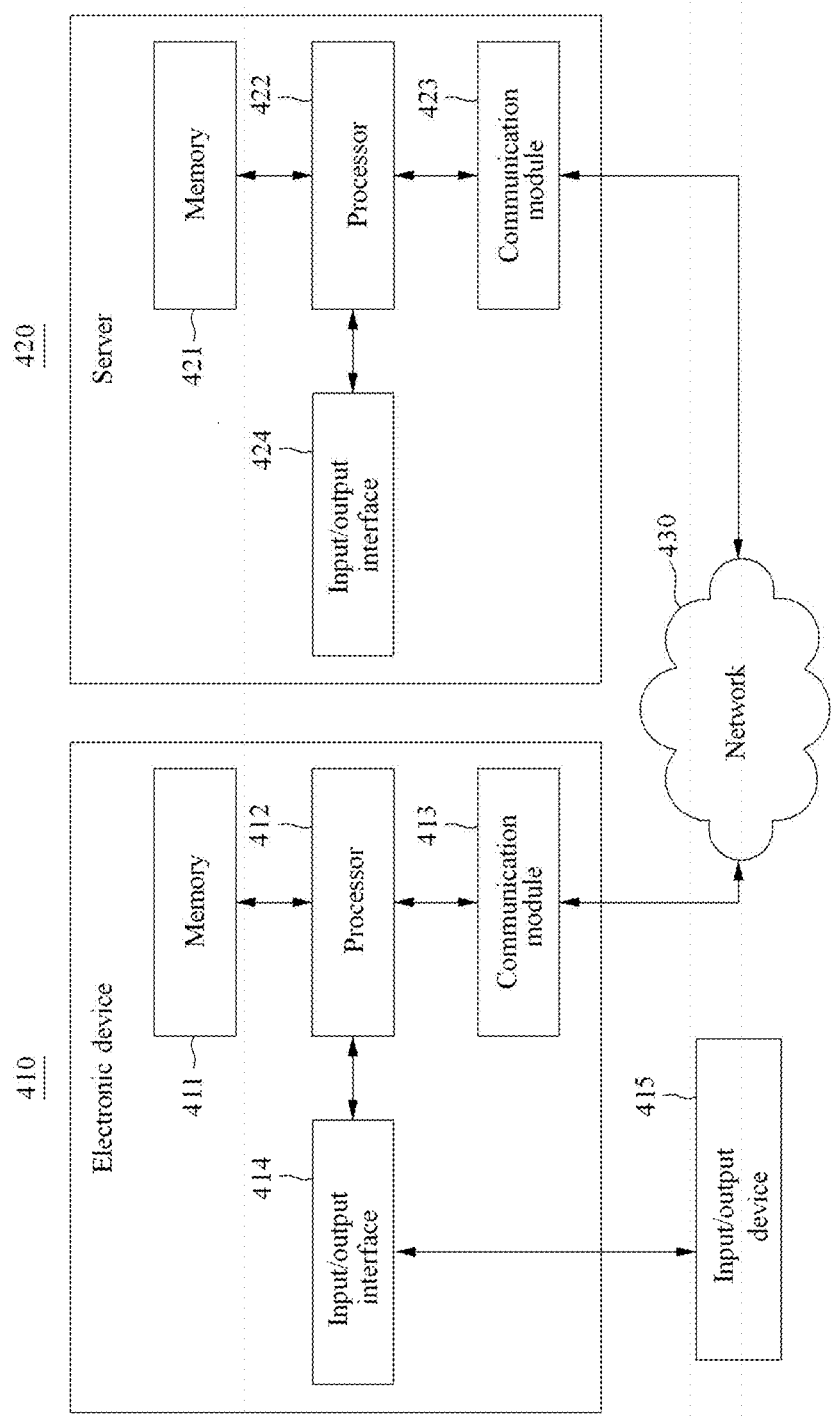
FIG. 4 is a block diagram illustrating an example of a configuration of an electronic device and a server according to an example embodiment.

FIG. 4 is a block diagram illustrating an example of an electronic device and a server according to an example embodiment. An electronic device 410 of FIG. 4 may correspond to the aforementioned electronic device 100, and a server 420 may correspond to the aforementioned external server 220 or a single computer apparatus that constitutes the cloud AI platform 320.

Referring to FIG. 4, the electronic device 410 may include a memory 411, a processor 412, a communication module 413, and an input/output (I/O) interface 414, and the server 420 may include a memory 421, a processor 422, a communication module 423, and an I/O interface 424. The memory 411, 421 may include a permanent mass storage device, such as a random access memory (RAM), a read only memory (ROM), and a disk drive, as a non-transitory computer-readable storage medium. The permanent mass storage device, such as ROM and disk drive, may be included in the electronic device 410 or the server 420 as a permanent storage device separate from the memory 411, 421. Also, an OS or at least one program code, for example, a code for an application installed and executed on the electronic device 410 to provide a specific service, may be stored in the memory 411, 421. Such software components may be loaded from another non-transitory computer-readable storage medium separate from the memory 411, 421. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 411, 421 through the communication module 413, 423, instead of the non-transitory computer-readable storage medium. For example, at least one program may be loaded to the memory 411 of the electronic device 410 based on a computer program, for example, the application, installed by files provided over a network 430 from developers or a file distribution system providing an installation file of the application.

The processor 412, 422 may be configured to process instructions of a computer program by performing basic arithmetic operations, logic operations, and I/O operations. The computer-readable instructions may be provided from the memory 411, 421 or the communication module 413, 423 to the processor 412, 422. For example, the processor 412, 422 may be configured to execute received instructions in response to the program code stored in the storage device, such as the memory 411, 421.

The communication module 413, 423 may provide a function for communication between the electronic device 410 and the server 420 over the network 430 and may provide a function for communication between the electronic device 410 and/or the server 420 and another electronic device or another server. For example, the processor 412 of the electronic device 410 may forward a request created based on a program code stored in the storage device such as the memory 411, to the server 420 over the network 430 under control of the communication module 413. Inversely, a control signal, an instruction, content, a file, etc., provided under control of the processor 422 of the server 420 may be received at the electronic device 410 through the communication module 413 of the electronic device 410 by going through the communication module 423 and the network 430. For example, a control signal, an instruction, content, a file, etc., of the server 420 received through the communication module 413 may be forwarded to the processor 412 or the memory 411, and content, a file, etc., may be stored in a storage medium, for example, the permanent storage device, further includable in the electronic device 410.

The I/O interface 414 may be a device used to interface with an I/O apparatus 415. For example, an input device of the I/O apparatus 415 may include a device, such as a microphone, a keyboard, and a mouse, and an output device of the I/O apparatus 415 may include a device, such as a display and a speaker. As another example, the I/O interface 414 may be a device to interface with an apparatus in which an input function and an output function are integrated into a single function, such as a touchscreen. The I/O apparatus 415 may be configured as a single device with the electronic device 410. Also, the I/O interface 424 of the server 420 may be a device to interface with an apparatus (not shown) for input or output that may be connected to the server 420 or included in the server 420.

According to other example embodiments, the electronic device 410 and the server 420 may include a smaller or greater number of components than the number of components shown in FIG. 4. However, there is no need to clearly illustrate many components according to the related art. For example, the electronic device 410 may include at least a portion of the I/O apparatus 415, or may further include other components, for example, a transceiver, a global positioning system (GPS) module, a camera, a variety of sensors, a database (DB), and the like. In detail, if the electronic device 410 is a smartphone, the electronic device 410 may be configured to further include a variety of components, for example, an accelerometer sensor, a gyro sensor, a camera module, various physical buttons, a button using a touch panel, an I/O port, a vibrator for vibration, etc., which are generally included in the smartphone.

In the example embodiments, the electronic device 410 may basically include a microphone for receiving a voice request of a user and/or a speaker for auditorily outputting response information as the I/O apparatus 415.

Figure 5:
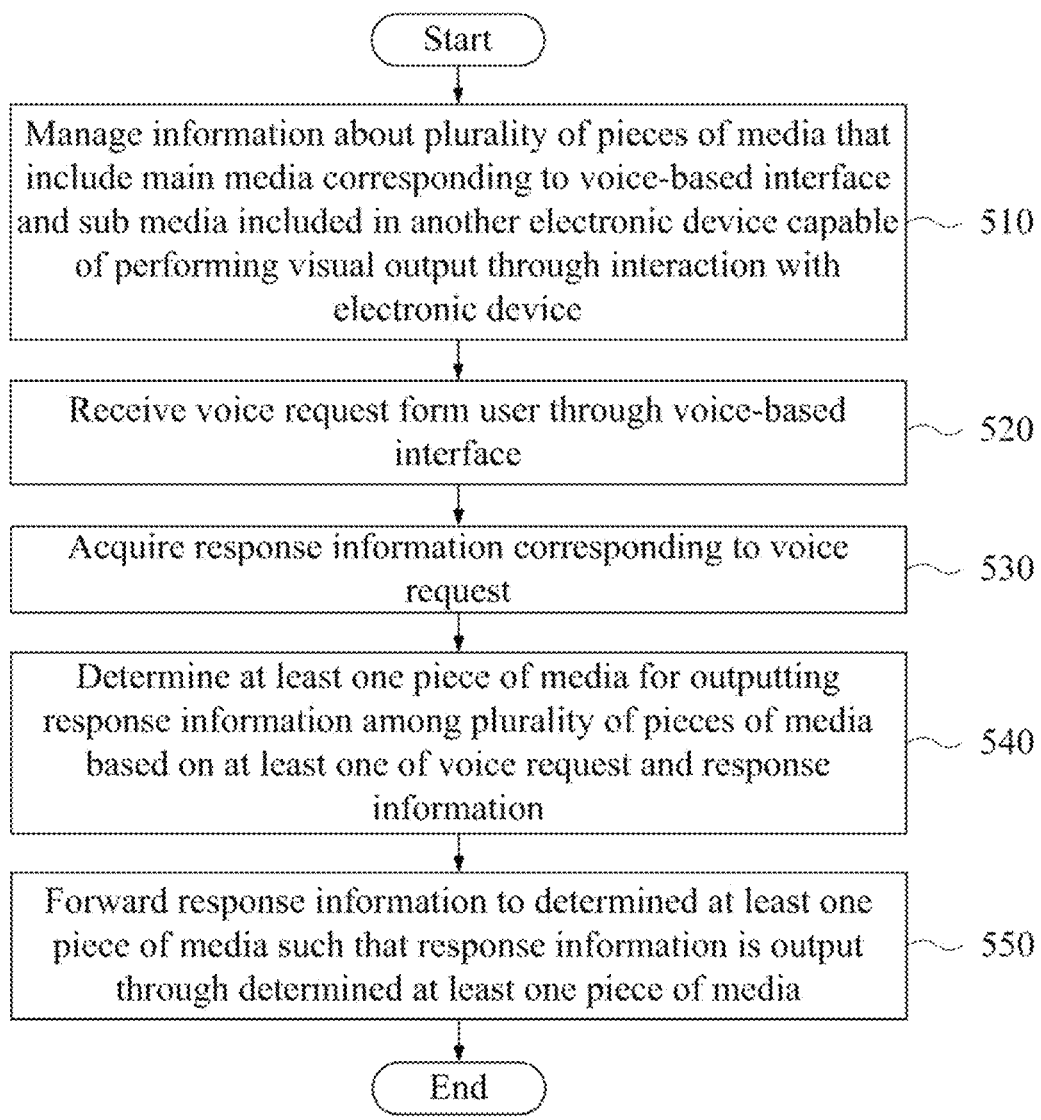
FIG. 5 is a flowchart illustrating an example of an information providing method according to an example embodiment.

FIG. 5 is a flowchart illustrating an example of an information providing method according to an example embodiment. The information providing method according to example embodiments may be performed by a computer apparatus, such as the electronic device 410. Here, the processor 412 of the electronic device 410 may be configured to execute a control instruction according to a code of at least one program or a code of an OS included in the memory 411. Here, the processor 412 may control the electronic device 410 to perform operations 510 to 550 included in the information providing method of FIG. 5 in response to a control instruction provided from the code stored in the electronic device 410.

In operation 510, the electronic device 410, by the processor 412, may manage information about a plurality of pieces of media that includes main media corresponding to a voice-based interface and sub media included in another electronic device capable of performing a visual output through interaction with the electronic device 410. Here, the managing information may mean storing and maintaining the information. The electronic device 410 may manage information about a plurality of pieces of different sub media included in a plurality of different electronic devices capable of performing a visual output through interaction with the electronic device 410. The sub media may correspond to, for example, a display of the other electronic device or an application installed on the other electronic device. For example, the electronic device 410 may manage information about electronic devices capable of outputting the visual output among in-house electronic devices, such as, a display of an electronic device A, a map application installed on the electronic device A, a schedule application installed on the electronic device A, a display of an electronic device B, a search application installed on the electronic device B, and the like, and information about corresponding sub media by setting applications included in the corresponding electronic devices as the respective sub media. Also, the electronic device 410 may manage information about the main media corresponding to the voice-based interface included in the electronic device 410.

In operation 520, the electronic device 410, by the processor 412, may receive a voice request from the user through the voice-based interface. For example, the electronic device 410 may receive a voice request according to an utterance of the user through a voice input device, such as a microphone included in the I/O device 415 of the electronic device 410 or a microphone interacting with the electronic device 410.

In operation 530, the electronic device 410, by the processor 412, may acquire response information corresponding to the voice request. Here, the electronic device 410 may generate the response information corresponding to the voice request by directly recognizing and analyzing the voice request. Depending on example embodiments, the electronic device 410 may acquire the response information using an external platform, such as the aforementioned cloud AI platform 320. For example, the electronic device 410 may transmit the received voice request to an external platform. Here, the external platform may generate suitable response information by recognizing and analyzing the received voice request and may transmit the generated response information to the electronic device 410.

The response information refers to a reply to the voice request and may include a variety of information, for example, information for confirming the intent of the user, information for notifying processing of an operation suitable for the intent of the user, and/or a retrieved search result for the intent of the user. For example, response information corresponding to a voice request of the user "play music A" may further include an audio output of content "music A" with information for informing processing of an operation such as "I'll play music A".

In operation 540, the electronic device 410, by the processor 412, may determine at least one piece of media for outputting response information among a plurality of pieces of media based on at least one of the voice request and the response information. That is, in the example embodiments, media for outputting the response information may be selected from among various media based on the voice request and/or the response information instead of simply being preset. For example, instead of simply synthesizing response information with a voice and outputting the response information in an auditory manner in response to a voice request recognized according to an utterance of the user, the electronic device 410 may select media for auditory output, media for visual output, or media for audiovisual output, etc., based on a type of the response information and may output the response information through the selected media. Such a selection of media may be performed based on efficiency of the auditory output and the visual output that is verified based on the voice request and/or the response information. For example, it may be efficient for the auditory output to be output through the device media comprising a speaker, and the visual output may be efficient to output through the device media including the display. As a more specific example, the selection of the media based on the efficiency of the audio output and the visual output may be made based on the information illustrated in a table 600 of FIG. 6.

In operation 550, the electronic device 410, by the processor 412, may forward the response information to the determined at least one piece of media such that the response information may be output through the determined at least one piece of media. According to example embodiments, it is possible to selectively provide the response information to the user by selecting media, such as, selecting visually outputtable media if it is efficient to visually forward the response information and selecting auditorily outputtable media if it is efficient to auditorily forward the response information.

Figure 6:
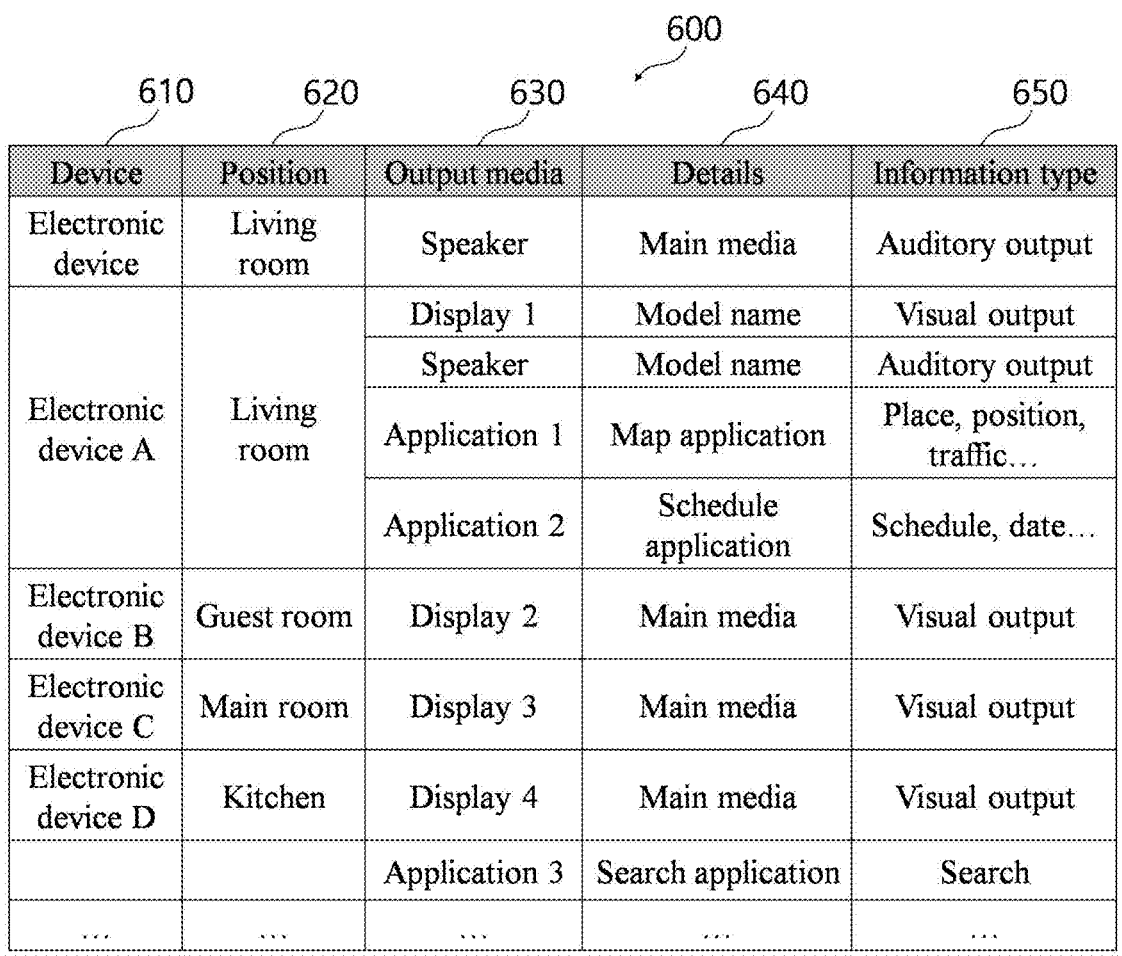
FIG. 6 illustrates an example of information about media according to an example embodiment.

FIG. 6 illustrates an example of media information according to an example embodiment. The table 600 of FIG. 6 includes a device field 610 for identifying electronic devices interacting with the electronic device 410, a position field 620 for identifying in-house positions or locations of the other electronic devices, an output media field 630 for identifying sub media included in the other electronic devices, a details field 640 including information about the sub media, and an information type item 650 for identifying information types, such as the auditory output, the visual output, place, position, traffic, schedule, date, etc., associable with the sub media. Referring to the table 600, the electronic device 410 may manage information about the other electronic devices interacting in a house and information about output media of the corresponding other electronic devices. Also, the information may be connected in advance to an information type of the voice request and/or response information. For example, if the voice request of the user or the corresponding response information is analyzed as an information type associated with "place", the electronic device 410 may determine a map application of the electronic device A as media for outputting the response information by referring to the table 600. In this case, the response information may be forwarded to the electronic device A and the electronic device A may provide the user with a map service corresponding to the response information through the map application of the electronic device A. As another example, the response information may be forwarded to a service server that provides the map service through the map application. In this case, the service server may provide the map service through the map application installed on the electronic device A. To this end, the electronic device 410 may further manage information for accessing the service server and information about an account of the user such that the service server may identify the electronic device A of the user. For example, the electronic device 410 may access the service server through a uniform resource locator (URL) further stored in the table 600 in association with the map application and may forward the response information with the account of the user, such that the service server may provide the map service associated with the response information through the map application installed on the electronic device A based on the account of the user. For example, the electronic device 410 may obtain information included in the table 600 using information obtained from the electronic devices through communication with the electronic devices interacting with the electronic device 410 and/or using information retrieved from the external server 220 through the obtained information from the electronic devices.

Figure 7:
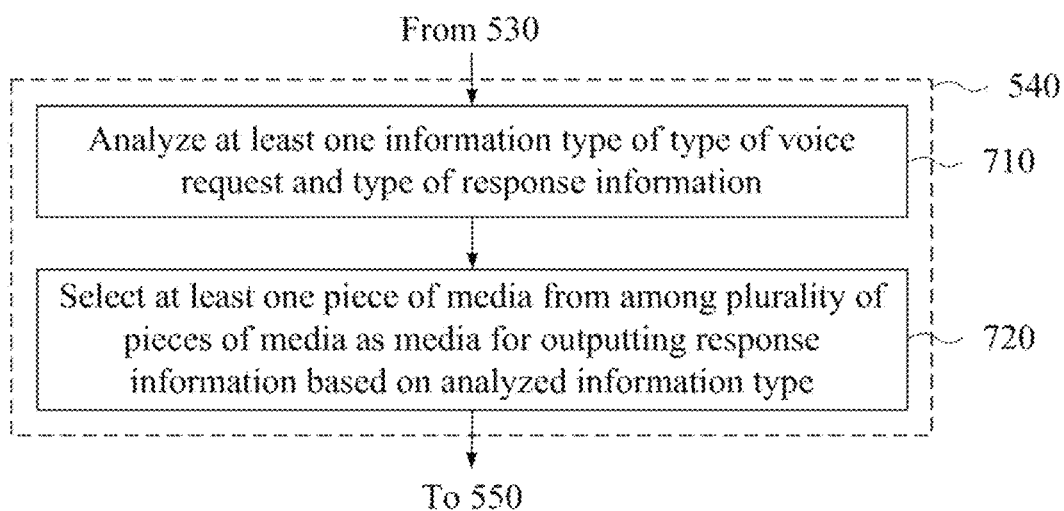
FIG. 7 is a flowchart illustrating an example of a method of determining media according to an example embodiment.

FIG. 7 is a flowchart illustrating an example of a method of determining media for outputting response information according to an example embodiment. Operations 710 and 720 of FIG. 7 may be included in operation 540 of FIG. 5 and thereby performed.

In operation 710, the electronic device 410, by the processor 412, may analyze at least one information type of a type of the voice request and a type of response information. For example, the type of the voice request may be classified based on the subject (e.g., position, place, traffic, search, singer, movie, etc.) of the voice request and the type of the response information may be classified based on a representation format (e.g., text, image, video, flash, etc.) of content included in the response information.

In operation 720, the electronic device 410, by the processor 412, may select at least one piece of media from among a plurality of pieces of media as media for outputting response information based on the analyzed information type. For example, if a webpage including a text, an image, and coordinates (or an address) corresponding to a voice request 'place' is acquired as response information, the electronic device 410 may select three pieces of media that include main media for synthesizing and thereby outputting the text in a voice, first sub media corresponding to a display for visually outputting the image, and second sub media corresponding to a map application for providing a map service using the coordinates (or the address) and may forward the acquired response information to each of the three pieces of media. Depending on example embodiments, the electronic device 410 may process the response information to information available in each piece of media and may forward the processed response information. For example, the electronic device 410 may extract coordinates (or address) from a webpage that is acquired as response information and may transmit a map service request including the extracted coordinates (or address) to the second sub media corresponding to the map application as the response information.

Also, as described above, the determined at least one piece of media may include sub media corresponding to a display of another electronic device. In this case, in operation 550, the electronic device 410 may transmit visual information included in the response information to the other electronic device such that the response information may be output through the display of the other electronic device. For example, the electronic device 410 may transmit the image or the video included in the webpage to the other electronic device. Alternatively, the electronic device 410 may also transmit the webpage itself to the other electronic device.

Also, the determined at least one piece of media may include sub media corresponding to an application installed on the other electronic device. In this case, in operation 550, the electronic device 410 may transmit the response information to a service server providing a service through the other electronic device or the application such that the response information may be provided through the other electronic device in conjunction with a service provided from the application. An example embodiment is described above.

Also, as described above, a plurality of pieces of media may be selected to output the response information in a duplicated or distributed manner. For example, in operation 550, the electronic device 410 may transmit the response information to the main media corresponding to the voice-based interface to output the response information in an auditory manner, and may further transmit the response information to at least one piece of sub media among first sub media corresponding to the other electronic device and second sub media corresponding to the application installed on the other electronic device, such that the response information may be further output in a visual manner. As described above, the response information may be processed to be suitable for each piece of media and thereby distributed and provided. The example in which auditory information, such as "Today's weather . . . " 230 is output through the speaker of the electronic device 100 and visual information is additionally output through the IPTV 140 is described above with reference to FIG. 2.

Meanwhile, the electronic device 410 according to an example embodiment may further provide additional information associated with response information in addition to the response information. To this end, the electronic device 410 may acquire the additional information associated with the response information in operation 530 or after operation 530. For example, the electronic device 410 may output response information in an auditory manner through main media and may further transmit additional information to at least one piece of sub media among first sub media corresponding to another electronic device and second sub media corresponding to an application installed on the other electronic device such that the additional information may be output in a visual manner. Depending on example embodiments, the electronic device 410 may select sub media for outputting the response information based on a type of the response information and may separately select sub media for outputting the additional information based on a type of the additional information. For example, in response to a request from the user for movie information using a voice, the electronic device 410 may synthesize text information associated with corresponding movie with the voice and may output the text information in an auditory manner through the main media and may output the additional information, such as a play date and a reservation link, in a visual manner through visual information transfer media such as a display of the other electronic device. As another example, in responses to a request from the user for singer information using a voice, the electronic device 410 may synthesize text information associated with a corresponding singer in a voice and may output the text information in an auditory manner through the main media and may output concert information and a concert reservation link or information about a new album and an album purchase site line through a visual information transfer media such as the display of the other electronic device.

Depending on example embodiments, if a plurality of response results is present with respect to a voice request, the electronic device 410 may synthesize response information having a highest correlation with the voice request with a voice and may output the response information in an auditory manner through the main media and may output a list of the entire response information in a visual manner through a visual information transfer media such as the display of the other electronic device. In this case, remaining response information excluding the response information having the highest correlation with the voice request may be the additional information.

The response information or the additional information may further include an advertisement, and only the advertisement may be output through separate media. For example, the response information may be output in an auditory manner through the main media and the advertisement may be output in a visual manner through sub media.

Meanwhile, media may be determined based on a position of a user and a position between other electronic devices.

Figure 8:
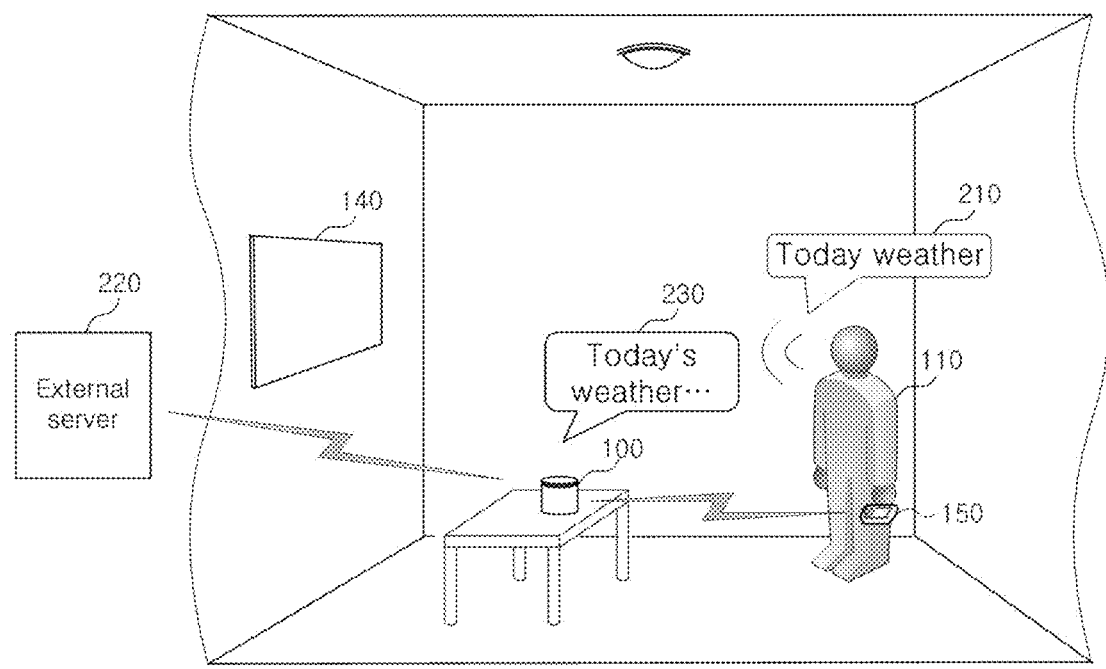
FIG. 8 illustrates an example of determining media based on a position of a user according to an example embodiment.

FIG. 8 illustrates an example of determining media based on a position of a user according to an example embodiment. An example of outputting auditory information through the electronic device 100 and, at the same time, outputting visual information through the IPTV 140 is described above with reference to FIG. 2. Also, as described above with reference to FIG. 6, various types of electronic devices capable of outputting visual information may be present. FIG. 8 illustrates an example of selecting media of the mobile device 150 relatively close to the user 110 from between the IPTV 140 and the mobile device 150 capable of outputting visual information.

For example, the electronic device 100 may manage positions of different electronic devices that correspond to a plurality of pieces of media and interact with the electronic device 100. The table 600 of FIG. 6 shows an example of managing a position of each of the electronic devices. Here, positions of electronic devices present in a house may be set using various methods. For example, such a position may be input and set to the electronic device 100 by the user 110 or an administrator, or may be measured based on known positioning technology, using such as strength of a signal transmitted and received for communication between the electronic device 100 and the other electronic devices. In particular, a position of the mobile device 150 may be dynamically measured using the positioning technology. Here, the electronic device 100 may determine at least one piece of media by further using a distance between the user 110 and the plurality of other electronic devices that is measured based on the position of the user 110 and the positions of the plurality of other electronic devices. Here, the position of the user 110 may be measured based on an utterance of the user 110. For example, the electronic device 100 may generate position information associated with a voice input based on a phase shift of the voice input that is input through a plurality of microphones included in the voice-input interface and may determine the generated position information as the position of the user 110. Technology for measuring an originating position of a sound signal based on a phase shift of the same sound signal input through the plurality of microphones may be easily understood by those skilled in the art through the known art, such as, for example, beamforming technology. In this case, the electronic device 100 may forward the response information to another electronic device closest to the user 110 based on the position of the user 110 and the positions of the other electronic devices. For example, referring to FIG. 8, the response information is forwarded to the mobile device 150 closest to the user 110 between the IPTV 140 and the mobile device 150 capable of performing the visual output.

Meanwhile, an example embodiment in which a plurality of users is present may be considered.

Figure 9:
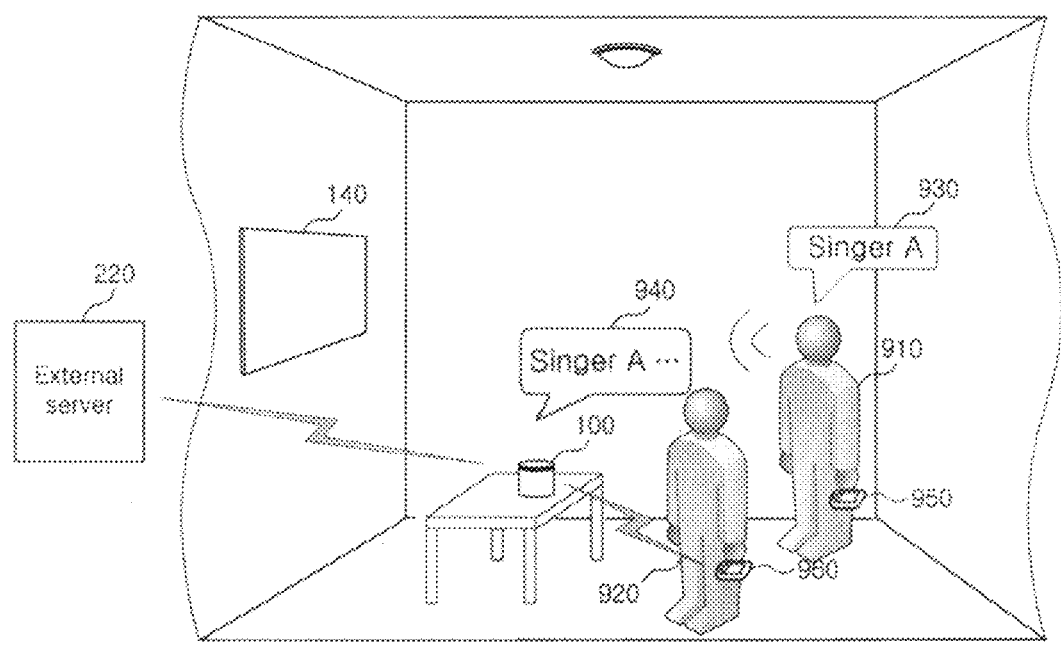
FIG. 9 illustrates an example of providing information to a plurality of users according to an example embodiment.

FIG. 9 illustrates an example of providing information to a plurality of users according to an example embodiment. A plurality of users 910 and 920 may be present within a single space. Here, the electronic device 100 may recognize the plurality of users 910 and 920 present around the electronic device 100. A user recognition may be identified based on a user voice. Here, the electronic device 100 may select at least one user from among the plurality of users based on a gesture trigger identified by at least one of the plurality of users or a preference for each subject preset for each of the plurality of users, and may select media associated with the selected at least one user as media for outputting the response information.

For example, FIG. 9 illustrates an example in which the electronic device 100 provides information "Singer A . . . " 940 about "singer A" in an auditory manner through main media in response to an utterance "singer A" 930 of the first user 910. Here, the electronic device 100 may further acquire additional information (e.g., a concert schedule and a concert reservation link) about "Singer A", and may further select additional media for outputting the additional information. In this case, the electronic device 100 may select a user performing a specific gesture or a user having a specific preference for "Singer A" among the plurality of users 910 and 920. FIG. 9 illustrates an example in which the electronic device 100 provides additional information to media associated with the second user 920, that is, media included in a mobile device 960 associated with the second user 920 between mobile devices 950 and 960, regardless of the utterance of the first user 910.

The gesture trigger may indicate a preset gesture, such as, for example, an action of raising a hand. For example, the electronic device 100 may analyze an image input through a camera and may select a user performing the preset gesture. As another example, the electronic device 100 may select the second user 920 by recognizing an action of raising a hand with holding the mobile device 960 based on an output value of a sensor received from the mobile device 960.

The preference for each subject may include preference of each of users with respect to a subject associated with the response information. To this end, the electronic device 100 may manage information about a user preference for each subject. Such preference information may be preset by analyzing instant messages transmitted and received between users, information uploaded to a social network service (SNS), a channel preferred by the users, and existing information such as a broadcast program. For example, although the first user 910 requests a voice request for "Singer A", a preference of the second user 920 for "Singer A" may be relatively high. In this case, additional information may be forwarded to the mobile device 960 of the second user 920.

Figure 10:
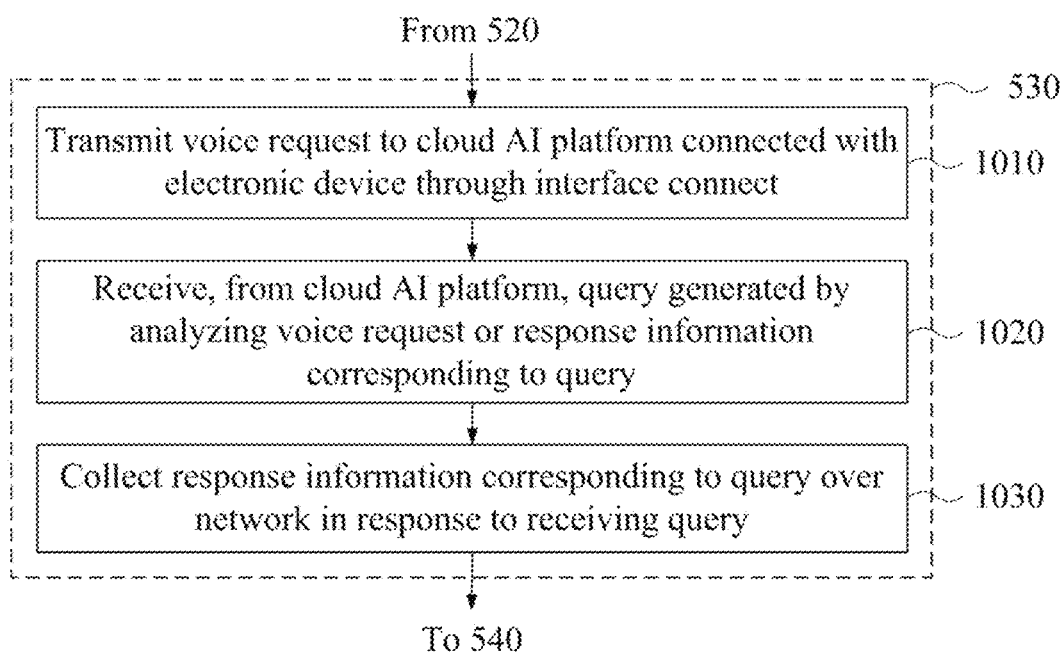
FIG. 10 is a flowchart illustrating an example of a method of acquiring response information according to an example embodiment.

FIG. 10 is a flowchart illustrating an example of a method of acquiring response information according to an example embodiment. Operations 1010 to 1030 of FIG. 10 may be included in operation 530 of FIG. 5 and thereby performed.

In operation 1010, the electronic device 410, by the processor 412, may transmit a voice request to a cloud AI platform connected with the electronic device through an interface connector. Here, the cloud AI platform and the interface connector may correspond to the cloud AI platform 320 and the interface connector 340 of FIG. 3, respectively.

In operation 1020, the electronic device 410, by the processor 412, may receive, from the cloud AI platform, a query generated by analyzing the voice request or response information corresponding to the query. When the response information is received, the electronic device 410 may perform operation 540 based on the received response information. On the contrary, when the query is received, the electronic device 410 may perform operation 1030.

In operation 1030, in response to receiving the query, the electronic device 410, by the processor 412, may collect response information corresponding to the query over the network. The electronic device 410 may perform operation 540 based on the collected response information.

As described above, according to example embodiments, it is possible to manage information about a plurality of pieces of media, such as main media corresponding to a voice-based interface included in an electronic device, such as an AI speaker, and sub media (e.g., a display included in a smartphone, an IPTV, a smart refrigerator, etc.) included in another electronic device interacting with the electronic device and to automatically select media for outputting response information from among a plurality of pieces of media based on a voice request received through the voice-based interface and the response information corresponding to the voice request. Also, it is possible to easily connect to a subsequent action likely to occur after providing information by connecting to a service (e.g., a service provided through an application installed on a smartphone) provided from selected media or by providing response information and additional information associated with the response information through different pieces of media instead of simply outputting the response information in an auditory and/or visual manner. Also, although response information is provided through sub media, it is possible to further effectively determine sub media used to provide response information among a plurality of pieces of sub media.

The systems or apparatuses described above may be implemented using hardware components, software components, or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable media including program instructions to implement various operations of the above-described example embodiments. The media may also include, alone or in combination with the program instructions, data files, data structures, and the like. The media may continuously store a program executable by a computer or may temporarily store or the program for execution or download. Also, the media may be various types of recording devices or storage devices in which a single piece or a plurality of pieces of hardware may be distributed over a network without being limited to a medium directly connected to a computer system. Examples of the media include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed at Appstore that distributes applications or sites and servers that supply and distribute various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An information providing method of an electronic device comprising a voice-based interface, the method comprising:
   managing, by a processor, information about a plurality of pieces of media comprising main media corresponding to the voice-based interface and sub media including at least one other electronic device configured for displaying a visual output through interaction with the electronic device;
   receiving, by the processor, a voice request from a user through the voice-based interface, wherein the user is from a plurality of users in a designated location;
   acquiring, by the processor, response information corresponding to the voice request;
   determining, by the processor, at least one piece of media for outputting the response information from among the plurality of pieces of media based on an information type of the voice request acquired by classifying the voice request based on a subject of the voice request;
   forwarding, by the processor, the response information to the determined at least one piece of media such that the response information is output through the determined at least one piece of media in said designated location and received by the user;
   wherein the acquiring comprises acquiring a plurality of response results as the response information based on a correlation with the voice request,
   wherein the determining comprises:
   determining a first user from the plurality of users, that made the voice request in the designated location by analyzing the voice associated with the voice request;
   recognizing the first user from among the plurality of users in said designated location based on preference information for the determined subject of the voice request preset for each of the plurality of users;
   selecting at least two pieces of media associated with the recognized first user from among the plurality of pieces of media for outputting the response information,
   wherein the response information is audibly output through a first piece of media among the selected at least two pieces of media, and
   wherein the method further comprises:
   recognizing a second user from the plurality of users who performs a preset gesture;
   selecting a piece of media associated with the recognized second user from among the plurality of pieces of media for outputting additional information associated with the response information; and
   providing the additional information to the piece of media associated with the recognized second user.

2. The method of claim 1, wherein the determining of the at least one piece of media for outputting the response information comprises:
   analyzing at least one information type from the voice request; and
   selecting the at least one piece of media from among the plurality of pieces of media as the media for outputting the response information based on the analyzed information type.

3. The method of claim 2, wherein the type of the voice request is classified based on the subject of the voice request, and
   the type of the response information is classified based on a representation format of content included in the response information.

4. The method of claim 1, wherein the forwarding of the response information to the determined at least one piece of media comprises processing the response information based on the media to which the response information is to be forwarded and transmitting the processed response information to the media.

5. The method of claim 1, wherein the determined at least one piece of media comprises sub media corresponding to a display of the at least one other electronic device, and
   the forwarding of the response information to the determined at least one piece of media comprises forwarding visual information to the at least one other electronic device such that the visual information included in the response information is output through the display of the at least one other electronic device.

6. The method of claim 1, wherein the determined at least one piece of media comprises sub media corresponding to an application installed on the at least one other electronic device, and
   the forwarding of the response information to the determined at least one piece of media comprises transmitting the response information to the at least one other electronic device or a service server providing a service through the application such that the response information is provided through the at least one other electronic device in conjunction with the service provided from the application.

7. The method of claim 1, wherein the forwarding of the response information to the determined at least one piece of media comprises:
   transmitting the response information to the main media corresponding to the voice-based interface such that the response information is output in an auditory manner; and
   further transmitting the response information to at least one sub media among first sub media corresponding to the at least one other electronic device and second sub media corresponding to an application installed on the at least one other electronic device such that the response information is further output in a visual manner.

8. The method of claim 1, further comprising:
   transmitting the response information to the main media corresponding to the voice-based interface such that the response information is output in an auditory manner; and
   further transmitting the additional information to at least one piece of sub media among first sub media corresponding to the at least one other electronic device and second sub media corresponding to an application installed on the at least one other electronic device such that the additional information is further output in a visual manner.

9. The method of claim 1, further comprising:
managing positions of a plurality of different electronic devices that corresponds to the at least one piece of media and interacts with the electronic device; and
acquiring a position of the first user,
wherein the determining the at least one piece of media for outputting the response information comprises determining the at least one piece of media by further using a distance between the first user and the plurality of different electronic devices that is measured based on the position of the first user and the positions of the plurality of different electronic devices.

10. The method of claim 1, wherein the determining of the at least one piece of media for outputting the response information comprises:
recognizing a plurality of users present around the electronic device;
selecting at least one user from among the plurality of users based on a gesture trigger identified by at least one of the plurality of users or a preference for each subject preset for each of the plurality of users; and
selecting media associated with the selected at least one user as the media for outputting the response information.

11. The method of claim 1, wherein the acquiring of the response information corresponding to the voice request comprises:
transmitting the voice request to a cloud artificial intelligence (AI) platform connected to the electronic device through an interface connector;
receiving, from the cloud AI platform, a query generated by analyzing the voice request or response information corresponding to the query; and
collecting the response information corresponding to the query over a network in response to receiving the query.

12. A non-transitory computer-readable storage medium storing a program to implement the method according to claim 1 on a computer.

13. An electronic device comprising:
a voice-based interface; and
at least one processor configured to execute a computer-readable instruction,
wherein the at least one processor is configured to
manage information about a plurality of pieces of media comprising main media corresponding to the voice-based interface and sub media including at least one other electronic device capable of performing a visual output through interaction with the electronic device,
receive a voice request from a user through the voice-based interface, wherein the user is from a plurality of users in a designated location;
acquire response information corresponding to the voice request;
determine at least one piece of media for outputting the response information from among the plurality of pieces of media based on a subject of the voice request and the response information, the at least one piece of media being in the designated location that is positioned in the same location as the plurality of users so that the user receives the response information from the at least one piece of media and is separated from the plurality of pieces of media as each of the plurality of pieces of media is included in a separate device, and
forward the response information to the determined at least one piece of media such that the response information is output through the determined at least one piece of media in said designated location and received by the user at the same time,
wherein the process is configured to determine the at least one piece of media by:
determining a first user from the plurality of users, that made the voice request in the designated location by analyzing the voice associated with the voice request;
recognizing the first user from among the plurality of users in said designated location based on preference information for the determined subject of the voice request preset for each of the plurality of users;
selecting at least two pieces of media associated with the recognized first user from among the plurality of pieces of media for outputting the response information,
wherein the response information is audibly output through a first piece of media among the selected at least two pieces of media; and
recognizing a second user from the plurality of users who performs a preset gesture;
selecting a piece of media associated with the recognized second user from among the plurality of pieces of media for outputting additional information associated with the response information; and
providing the additional information to the piece of media associated with the recognized second user.

14. The electronic device of claim 13, wherein, to determine the at least one piece of media for outputting the response information, the at least one processor is configured to
analyze at least one information type among a type of the voice request and a type of the response information, and
select the at least one piece of media from among the plurality of pieces of media as the media for outputting the response information based on the analyzed information type.

15. The electronic device of claim 13, wherein a type of the voice request is classified based on a subject of the voice request, and
a type of the response information is classified based on a representation format of content included in the response information.

16. The electronic device of claim 13, wherein the at least one processor is configured to process the response information based on the media to which the response information is to be forwarded and to transmit the processed response information to the media.

17. The electronic device of claim 13, wherein the determined at least one piece of media comprises sub media corresponding to a display of the other electronic device, and
wherein to forward the response information to the determined at least one piece of media, the at least one processor is configured to forward visual information to the at least one other electronic device such that the visual information included in the response information is output through the display of the at least one other electronic device.

18. The electronic device of claim 13, wherein the determined at least one piece of media comprises sub media corresponding to an application installed on the other electronic device, and wherein to forward the response information to the determined at least one piece of media, the at least one processor is configured to transmit the response information to the at least one other electronic device or a service server providing a service through the application such that the response information is output through the at least one other electronic device in conjunction with the service provided from the application.

19. The electronic device of claim 13, wherein, to forward the response information to the determined at least one piece of media, the at least one processor is configured to transmit the response information to the main media corresponding to the voice-based interface such that the response information is output in an auditory manner, and further transmit the response information to at least one piece of sub media among first sub media corresponding to the at least one other electronic device and second sub media corresponding to an application installed on the at least one other electronic device such that the response information is further output in a visual manner.

\* \* \* \* \*